(12) United States Patent
Ollier et al.

(10) Patent No.: US 11,693,481 B2
(45) Date of Patent: Jul. 4, 2023

(54) MULTIMODAL HAPTIC DEVICE

(71) Applicant: COMMISSARIAT A L'ENERGIE ATOMIQUE ET AUX ENERGIES ALTERNATIVES, Paris (FR)

(72) Inventors: Emmanuel Ollier, Grenoble (FR); Tristan Caroff, Grenoble (FR); Fabrice Casset, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days.

(21) Appl. No.: 17/538,883

(22) Filed: Nov. 30, 2021

(65) Prior Publication Data
US 2022/0171464 A1 Jun. 2, 2022

(30) Foreign Application Priority Data

Dec. 1, 2020 (FR) ...................................... 2012475

(51) Int. Cl.
*G06F 3/01* (2006.01)
*G06F 3/02* (2006.01)
(52) U.S. Cl.
CPC ............ *G06F 3/016* (2013.01); *G06F 3/0202* (2013.01)
(58) Field of Classification Search
None
See application file for complete search history.

(56) References Cited

U.S. PATENT DOCUMENTS

| 9,703,381 | B2 | 7/2017 | Gallo et al. |
| 10,437,340 | B1 * | 10/2019 | Sullivan ................. G01K 13/20 |
| 2015/0220199 | A1 | 8/2015 | Wang et al. |
| 2019/0278374 | A1 | 9/2019 | Sato et al. |

FOREIGN PATENT DOCUMENTS

| KR | 2012-0018245 A | 3/2012 |
| KR | 101 767 485 B1 | 8/2017 |
| WO | 2018/143418 A1 | 8/2018 |

OTHER PUBLICATIONS

Murakami, et al., "Altered Touch: Miniature Haptic Display with Force, Thermal and Tactile Feedback for Augmented Haptics", SIGGRAPH 2017 Emerging Technologies, Jul. 2017.
Zhou, et al., "High-performance and compact-designed flexible thermoelectric modules enabled by a reticulate carbon nanotube architecture", Nature Communication, 2017.
Abad, et al., "An Untethered Multimodal Haptic Hand Wearable", 2021 IEEE Sensors, 2021.
Singhal, et al., "Perceptual interactions in thermo-tactile displays", 2017 IEEE World Haptics Conference (WHC), pp. 90-95, 2017.

* cited by examiner

*Primary Examiner* — Carl Adams
(74) *Attorney, Agent, or Firm* — BakerHostetler

(57) ABSTRACT

A multimodal haptic device includes a matrix incorporating at least one cell, each cell comprising: at least one thermal element capable of generating a cooling and a heating; at least one vibratory element capable of generating a vibration; and at least one encapsulation layer made of an electrically insulating material; the at least one vibratory element and the at least one thermal element being anchored in at least one part in the at least one encapsulation layer; each cell being adapted to be in contact directly or indirectly with the skin of a person so as to transmit thermal and/or vibratory sensations to that person, the cell having a thickness less than or equal to ten millimetres.

20 Claims, 11 Drawing Sheets

MULTIMODAL HAPTIC DEVICE

CROSS-REFERENCE TO RELATED APPLICATIONS

This application claims priority to foreign French patent application No. FR 2012475, filed on Dec. 1, 2020, the disclosure of which is incorporated by reference in its entirety.

FIELD OF THE INVENTION

The invention relates to the field of haptics, and relates more particularly to a multimodal haptic device, that is to say a device capable of applying, to a user, forces, pressures, vibrations and/or movements as well as temperature differences to transmit, to that person, different sensations or different information (texture, viscosity, shape, force, heat, etc.). More specifically, the haptic device takes the form of a multimodal haptic matrix comprising one or more cells incorporated in the matrix.

BACKGROUND

The term "haptic" denotes the science of touch. Unlike the term "tactile" which defines only the sense of touch, "haptic" encompasses the kinaesthetic dimension of touch, that is to say the perception of the body in the environment.

A haptic device is a tactile and kinaesthetic system which can notably create a communication between a human being and a part of his or her environment, if necessary between the user and a virtual environment. A haptic device can for example allow a user to design, model and manipulate objects in a virtual environment with a tactile feeling (touch) and a kinaesthetic perception.

Several technologies combine tactile and kinaesthetic feedback, often by mounting a touch screen on a force feedback device. These technologies generally implement essentially mechanical means with, for example, miniaturized motors or piezoelectric elements generating a vibration which can indeed be modulated, but do not generally make it possible to provide realistic tactile information. The haptic feedback is then generally insufficient to render the environment tangible and is considerably lacking in realism. The human perception of touch is in fact multimodal, the human being needing multiple information, such as the form, the texture, the temperature to identify an object by touch. Interestingly, even in the absence of other tactile information, the human being is able to distinguish a variety of materials based solely on the thermal signals.

Some technologies incorporate piezoelectric elements in a flexible matrix such as a flexible silicone polymer in order to better interact with the human body. Other technologies based on microfluidic elements make it possible to generate local pressures on a hand and therefore a certain sensation of touch. However, the fact remains that these technologies transmit only a quantity of information that is insufficient to allow a realistic perception of the human touch.

Other technologies incorporate elements to generate thermal haptic effects.

The patent U.S. Pat. No. 9,703,381 describes a multimodal haptic device comprising a first container and a second container, each containing a fluid at a specific temperature (for example a hot fluid and a cold fluid), a first pipeline and a second pipeline, each connected by a manifold to the first container and to the second container, and at least one tactile display unit connected to the first and second pipelines, a unit which is in fact a tactile transmission unit capable of transmitting tactile information to a body. The manifold comprises a pump and a valve for controlling and regulating the circulation of the fluids in the pipelines. The containers are coupled together by a Peltier element which can heat up the first container while it cools the second container. Thus, the hot fluid circulates in the first pipeline, the cold fluid circulates in the second pipeline, and the fluids are mixed according to proportions which can be set before reaching the tactile transmission unit to transmit a sensation of heat which can thus be modulated. The tactile transmission unit can comprise an inflatable chamber made of an elastic material and can transmit tactile feedback. The device described is therefore based on fluidic elements, the Peltier element making it possible to modulate the heat of these elements, thus being involved indirectly in the transmission of heat to the body. The device described is therefore relatively complex, with numerous elements, which makes it a relatively bulky device, with risks of fluid leakage, and potentially of thermal losses.

Another multimode haptic device is presented in the publication "*Altered Touch: Miniature Haptic Display with Force, Thermal and Tactile Feedback for Augmented Haptics*", Takaki Murakami, Tanner Person, Charith Lasantha Fernando, and Kouta Minamizawa (SIGGRAPH 2017 Emerging Technologies, July 2017 Article No.: 2 Pages 1-2, DOI: http://dx.doi.org/10.1145/3084822.3084836). The multimode haptic device described comprises a Peltier module associated with motors to generate the tactile and thermal effects. Nevertheless, it is a module suited only to the tips of the fingers. It is relatively bulky. It can incorporate only one Peltier module, which is impossible to repeat to obtain a large perception surface.

Other technologies address the manufacture of flexible Peltier modules in the form of flexible thin layers (rather than the Peltier modules with "legs" like those described previously and generally used) which can make it possible to reduce the volume of a Peltier module. One technology is described for example in the publication "*High-performance and compact-designed flexible thermoelectric modules enabled by a reticulate carbon nanotube architecture*" (Nature Communications, DOI: 10.1038/ncomms14886) which presents Peltier modules produced from thick deposits of carbon nanotubes doped by a solution of polyethyleneimine (PEI) in ethanol. This method makes it possible to obtain p and n dopings and to produce flexible modules. However, such a Peltier module allows temperature variations in the plane of the thin layer and not perpendicularly to said layer. Furthermore, that does not form a multimodal haptic device.

SUMMARY OF THE INVENTION

The invention aims to overcome the abovementioned drawbacks of the prior art.

More particularly, the invention aims to provide a multimodal haptic device that makes it possible to transmit not only mechanical or vibratory stresses (designated "vibratory mode" hereinbelow) but also temperature stresses (designated "thermal mode" hereinbelow) to a body, and which is of reduced thickness, that is to say a few millimetres, even less than a millimetre thick.

Preferably, a flexible multimodal haptic device is sought that can be adapted to different morphologies, that can even constitute a kind of second skin.

Also sought is a multimodal haptic device that can be driven, according to both the vibratory and thermal modes, and simultaneously.

The subject of the invention making it possible to remedy these drawbacks is a multimodal haptic device, said device comprising a matrix incorporating at least one cell, each cell comprising:

at least one thermal element capable of generating a cooling and a heating;

at least one vibratory element capable of generating a vibration; and at least one encapsulation layer made of an electrically insulating material;

the at least one vibratory element and the at least one thermal element being anchored in at least one part in said at least one encapsulation layer; each cell being adapted to be in contact directly or indirectly with the skin of a person so as to transmit thermal and/or vibratory sensations to that person, said cell having a thickness less than or equal to ten millimetres, the at least one thermal element having a height greater than that of the at least one vibratory element.

Encapsulation layer is understood to mean a layer which is conformed to anchor at least a part of the thermal and/or vibratory element or elements of a cell and/or of a matrix. An encapsulation layer does not necessarily entirely surround the thermal and vibratory element or elements.

According to the invention, the terms "thickness" and "height" designate the dimension in the direction perpendicular to the skin of a person when the haptic device is disposed on said skin, directly or indirectly. The longitudinal direction designates the direction corresponding to the greatest dimension of a cell, of a matrix or of a device in its main plane. The terms "below" and "above" should be understood with reference to the perpendicular direction.

The cell can have a length of between 1 and 20 millimetres, and a width of between 1 and 20 millimetres.

The haptic device according to the invention is therefore a multimodal haptic device that makes it possible to transmit not only vibratory stresses but also thermal stresses to the skin of a person, and its structure in the form of a matrix with one or more cells gives it a reduced thickness.

The device according to the invention can also comprise one or more of the following features taken in isolation or according to all possible technical combinations.

Preferably, at least one cell further comprises:

a plurality of bottom conductive tracks, capable of producing the electrical connections at the bottom parts of the thermal and vibratory elements; and a plurality of top conductive tracks, capable of producing the electrical connections at the top parts of the thermal and vibratory elements, and preferably at least the routing for the driving of said elements.

The bottom and/or top conductive tracks can be made of metal (for example of copper, gold, aluminium or nickel), or of carbon, or even based on conductive particles implemented for example in the form of conductive inks (for example based on PEDOT-PSS, the acronym for poly(3,4-ethylenedioxythiophene) (PEDOT) and for sodium poly(styrene sulfonate) (PSS)).

Preferably, the at least one cell comprises a plurality of conductive vias, said vias allowing vertical electrical connections to be produced between the top conductive tracks and the thermal and vibratory elements.

The vias can be made of copper, gold, aluminium and/or be conductive glues.

According to one embodiment, the at least one encapsulation layer comprises a first encapsulation layer made of a first insulating material and a second encapsulation layer made of a second insulating material, the first and second layers being able to be joined, and/or the first and second insulating materials being able to be the same.

According to a particular embodiment, the second encapsulation layer incorporates the top conductive tracks, forming an interconnect redistribution layer, said redistribution layer being preferably flexible.

According to a preferred embodiment, at least one thermal element is a Peltier element, preferably at least two Peltier elements of N and P type connected electrically in series to form a Peltier module.

In particular, at least one cell can comprise a heat sink means associated with at least one Peltier module. That makes it possible to guarantee optimal operation of a Peltier module in cooling mode.

According to one embodiment, that can be combined with the preceding embodiments, at least one thermal element is a heating resistor and/or a radiant element, for example an infrared (IR) radiant element. A heating resistor can be a resistor made of graphite (C) or a resistor made of silver (Ag).

A vibratory element can be a piezoelectric element, a ferroelectric element and/or an electromagnetic element.

According to a particular embodiment, at least one thermal and/or vibratory element, preferably all the thermal and/or vibratory elements, are entirely encapsulated in at least one encapsulation layer.

The encapsulation layer (or layers) can be made of one or more of the following materials: a polymer such as a polyethylene terephthalate (PET), a polyethylene naphthalate (PEN), a polyimide (PI), a polycarbonate (PC) or a silicone; a glass; a metal; or even a non-organic material such as silicon oxide.

The encapsulation layer (or layers) can be made of a flexible and/or stretchable material, for example a flexible polymer and/or an elastomer.

According to one embodiment, that can be combined with the preceding embodiments, at least one cell further comprises at least one additional heating track under at least one thermal and/or vibratory element, and preferably under at least one bottom conductive track.

According to one embodiment, that can be combined with the preceding embodiments, at least one cell comprises thinned sections between at least two thermal and/or vibratory elements in the thickness of at least one encapsulation layer. That makes it possible to make the cell more flexible.

According to one embodiment, that can be combined with the preceding embodiments, at least one cell comprises a pressure element, notably a layer of polymer or of plastic, possibly elastic, disposed over all of said cell and bearing on at least one element, capable of indirectly exerting a pressure against the skin. That makes it possible to promote a better thermal contact of the cell with the skin and to promote the vibratory behaviour of the membrane formed by the encapsulating material actuated by the vibratory element.

According to a particular embodiment, at least one cell comprises:

a central vibratory element; and at least two Peltier modules disposed around said vibratory element.

Advantageously, the Peltier modules can have heights greater than the height of the vibratory element. The Peltier modules with the encapsulation material can thus form a stiffener for the actuation of the vibratory element, thus enhancing the vibratory operation.

The matrix preferably comprises several cells, even more preferentially several identical cells.

According to one embodiment, at least two thermal and/or vibratory elements are disposed one on top of the other in one and the same cell and/or a matrix of cells.

According to an embodiment as an alternative to or complementing the preceding embodiment, at least two thermal and/or vibratory elements are disposed alongside one another in one and the same cell and/or a matrix of cells.

BRIEF DESCRIPTION OF THE DRAWINGS

Other features, details and advantages of the invention will emerge on reading the description given with reference to the attached drawings given by way of example, in which, respectively.

Throughout these figures, identical references can designate identical or similar elements.

Furthermore, the different parts represented in the figures are not necessarily represented according to a uniform scale, to render the figures more legible.

DETAILED DESCRIPTION

In all the embodiments, a cell 10 extends in a main plane XY. It has a thickness less than or equal to 10 millimetres, preferably between 0.1 and 5 millimetres. For example, it can have a thickness of between 1 and 5 mm in the case of a vertical integration and between 0.1 and 1 mm in the case of an in-plane integration.

A cell 10 can have a length (dimension in the direction X) of between 1 and 20 millimetres and a width (dimension in the direction Y) of between 1 and 20 millimetres.

The (encapsulation) material (or materials) can be flexible and/or stretchable, but it/they can also be rigid to be disposed for example on an interface of smartphone type.

Although the vibratory elements are generally presented in the form of piezoelectric elements, that is not limiting, and they can also be ferroelectric and/or electromagnetic elements.

In FIGS. 1 to 8D, the various elements of a cell are disposed alongside one another in the plane XY, and notably in a direction X of the plane XY. This integration of the various elements in the plane is preferred because it makes it possible to obtain the smallest thickness, notably making it possible to increase the bendability/flexibility of a cell. Furthermore, it makes it possible to promote the dynamics and the effectiveness of the transmissions through the immediate proximity of the elements to the skin, as much to heat and cool the surface of the skin as to transmit the vibrations to it. The small dimensions of the various elements also make it possible to maintain a spatial resolution close to the natural resolution obtained with the mechanical and thermal receptors of the skin, which makes it possible to reproduce a localized sensation on the skin.

Furthermore, in FIGS. 1 to 7C, 9A and 9B, the at least one encapsulation layer is conformed to entirely encapsulate the thermal and vibratory elements. However, this is not limiting. As illustrated in FIGS. 8A to 8D, the at least one encapsulation layer is conformed to anchor only a part of the thermal and vibratory elements of a cell.

Figure 1:
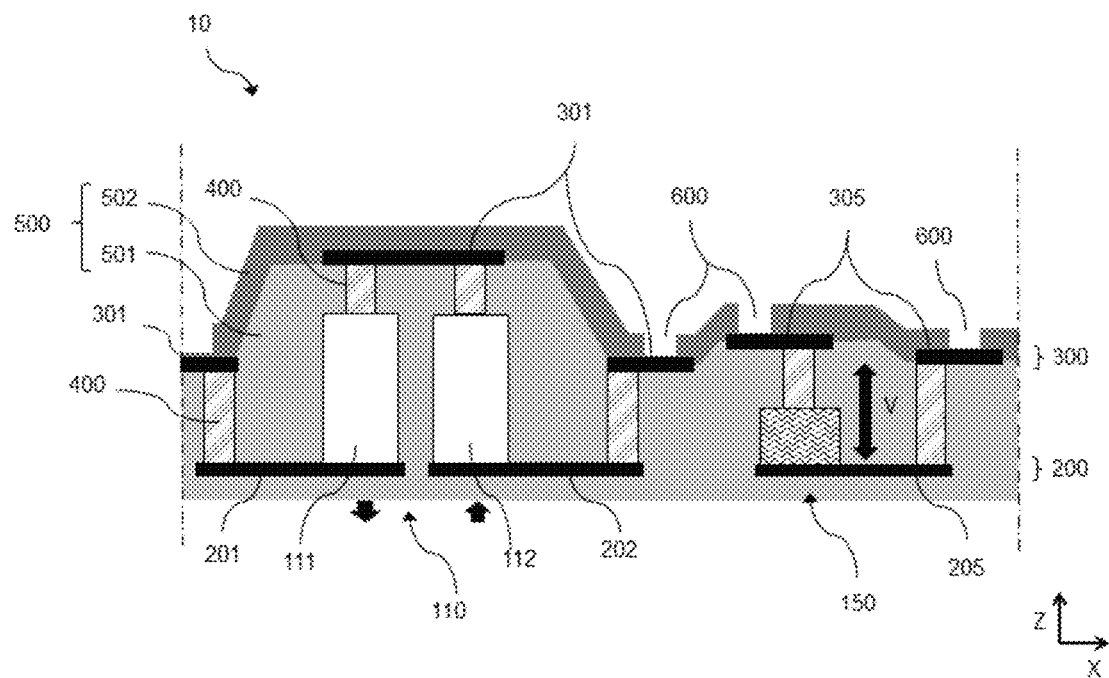
FIG. 1 represents a first embodiment of a multimodal haptic device according to the invention.

FIG. 1 represents a first embodiment of a multimodal haptic device according to the invention, more specifically of a cell included in a multimodal haptic device according to the invention.

The cell 10 comprises:

a Peltier module 110 comprising two Peltier elements 111, 112, each module being capable of generating a cooling and/or a heating according to the electrical bias applied to said element;

a vibratory element 150 disposed alongside the Peltier module in the direction X; and at least one encapsulation layer 500 made of an electrically insulating encapsulation material.

A Peltier module with two elements has been represented, but, generally, a Peltier module comprises more than two elements, this being applicable for all the embodiments and, more generally, for a cell or a matrix according to the invention.

Typically, a Peltier module comprises P-doped Peltier elements connected alternatively with N-type elements, and this arrangement allows heat to be absorbed on a top, respectively bottom, face of the module and heat to be rejected on the other, bottom, respectively top, face. The elements may be electrically connected to one another in series.

Alternatively, the Peltier elements of the module can be operated only in cooling mode. In this case, another thermal element can be provided for the heating, such as a heating resistor and/or a radiant element as is described hereinbelow.

Typically, the vibratory element is a piezoelectric element.

A plurality 200 of bottom conductive tracks 201, 202, 205 makes it possible to produce the electrical connections 201, 202 on the bottom parts of the Peltier elements 111, 112 and electrical contact 205 to be made on the bottom part of the vibratory element 150.

A plurality 300 of top conductive tracks 301, 305 makes it possible to produce the top electrical connections between the Peltier elements and the routing of the control signals for the Peltier elements (tracks 301), as well as the routing of the control signals for the vibratory element (tracks 305).

The bottom and/or top conductive tracks can be made of metal (for example of copper, gold, aluminium or nickel) or of carbon, or even based on conductive particles implemented for example in the form of conductive inks (for example based on PEDOT-PSS, the acronym for poly(3,4-ethylenedioxythiophene) (PEDOT) and for sodium poly(styrene sulfonate) (PSS)).

The vertical electrical connections between the top conductive tracks and the elements are produced by vias 500 made of a conductive material, for example of copper, gold, aluminium and/or conductive glues.

All the elements are entirely encapsulated in at least one encapsulation layer 500, thus forming said cell.

In the cell represented, there are two encapsulation layers 501, 502 joined together: a first layer or bottom layer 501 (made of a first encapsulation material) and a second layer or top layer 502 (made of a second encapsulation material).

The first encapsulation layer 501 makes it possible to entirely encapsulate the two Peltier elements 111, 112 and the vibratory element 150. It also makes it possible to encapsulate the bottom conductive tracks 200, the vias 400 and, possibly, the top conductive tracks 300 to a certain height. The second encapsulation layer 502 makes it possible to cover the top conductive tracks 300.

The second encapsulation layer 502 is open locally (openings or "pads" 600) on the top conductive tracks 300 to allow the driving connections for all of the elements.

The first and second encapsulation materials can be chosen from among one or more of the following materials: polymers such as polyethylene terephthalate (PET), polyethylene naphthalate (PEN), polyimide (PI), polycarbonate (PC), silicone; a thin glass; or even a thin metal; even a non-organic material such as silicon oxide. They can be made of the same material or of several different materials.

The encapsulation materials can be flexible materials, for example elastomers.

The first and/or the second encapsulation material is preferably a dielectric material, notably to form the electrical insulation between the elements and the electrical connection tracks in particular the top ones.

The cell 10 is intended to be in contact with the skin of a person, directly or indirectly (for example via a fabric).

The vibratory element and the thermal element are incorporated side-by-side in the main plane of the cell, and, here more specifically, in the longitudinal direction X of the cell 10.

In this first embodiment, the height of the vibratory element is less than the heights of the Peltier elements. This makes it possible to enhance the performance levels of the elements, and notably of the vibratory element, as will be explained hereinbelow. Furthermore, this variation in height is reflected by a variation in the thicknesses of the encapsulation layers, and notably of the bottom layer 501. A particular topology results therefrom, which offers an advantage, as will be developed hereinbelow also. More generally, in the invention, the thermal element or elements have a height greater than that of the vibratory element or elements in order to enhance the performance levels of the elements, and notably of the vibratory element.

Figure 2:
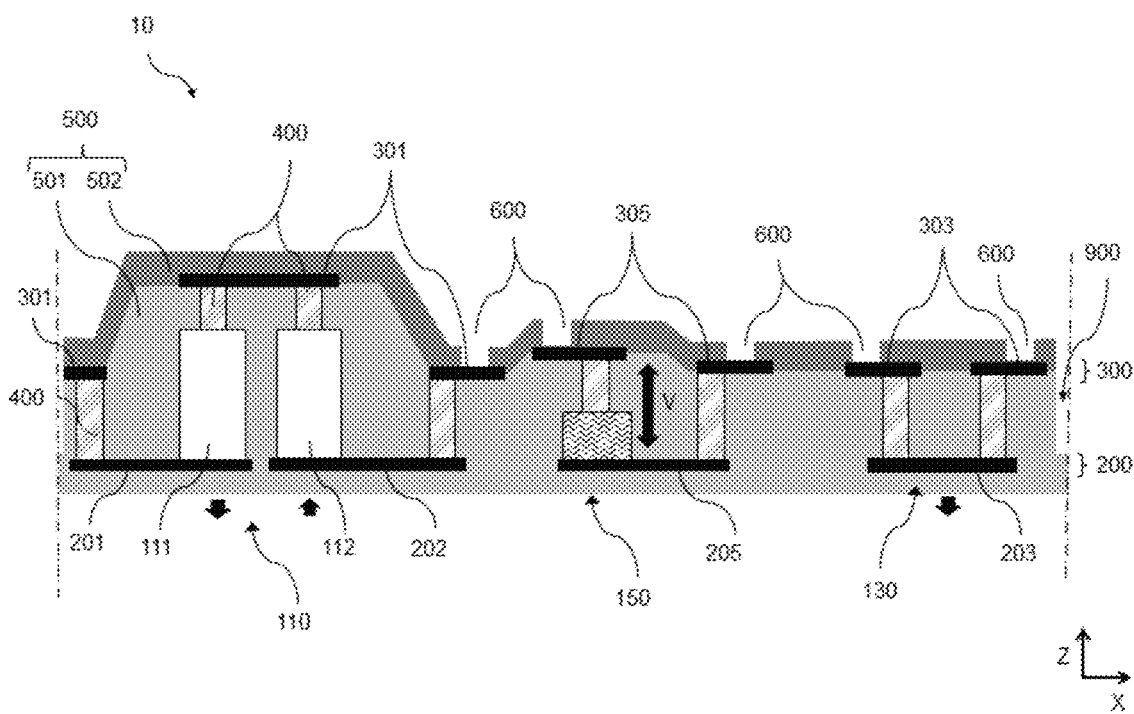
FIG. 2 represents a second embodiment of a multimodal haptic device according to the invention.

FIG. 2 represents a second embodiment of a multimodal haptic device according to the invention, more specifically of a cell included in a multimodal haptic device according to the invention. Said cell is distinguished from that of the first embodiment in that it further comprises a heating resistor 130 which is formed by an additional bottom conductive track 203 and which is disposed alongside the vibratory element 150 in the direction X. Two additional top conductive tracks 303 make it possible to produce the continuity of the electrical contact of the heating resistor 130 and the routing of the control signals for said resistor.

The heating resistor can be a resistor made of graphite (C) or a resistor made of silver (Ag), for example a resistor obtained from an ink comprising particles (possibly of nanometric size), for example of carbon or of silver (Nano Ag for example).

The first encapsulation layer 501 makes it possible to entirely encapsulate the two Peltier elements 111, 112, the heating resistor 130 and the vibratory element 150. It further makes it possible to encapsulate the bottom conductive tracks 200, the vias 400 and, possibly, the top conductive tracks 300 to a certain height. The second encapsulation layer 502 makes it possible to cover the top conductive tracks 300.

As for the first embodiment, the vibratory element and the thermal elements (Peltier elements and heating resistor) are incorporated side-by-side in the main plane of the cell, and, here more specifically, in the longitudinal direction X of the cell 10.

The heights of the vibratory element and of the heating resistor are less than the heights of the Peltier elements. Furthermore, this variation in height is reflected by a variation in the heights of the two encapsulation layers, and notably of the bottom layer 501. A particular topology results therefrom, which offers an advantage, as will be developed hereinbelow also.

It should be noted that, if the Peltier module is used for heating in addition to its cooling function, then the heating resistor may not be necessary and the first embodiment may then apply.

Figure 3:
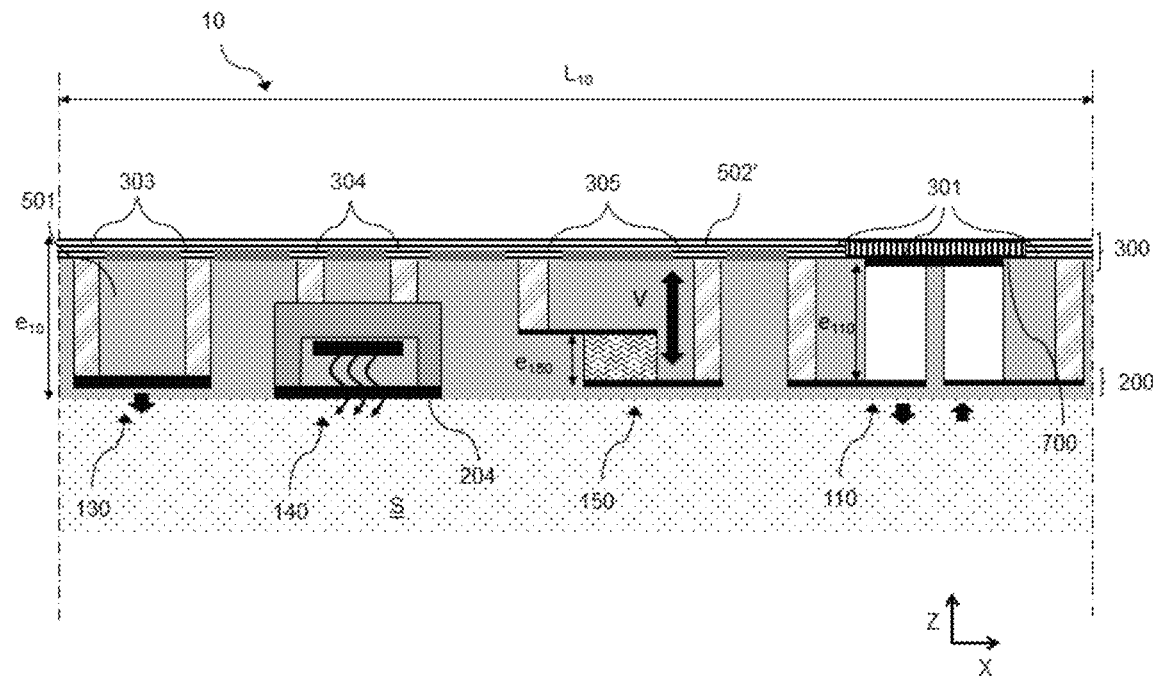
FIG. 3 represents a third embodiment of a multimodal haptic device according to the invention.

FIG. 3 represents a third embodiment of a multimodal haptic device according to the invention, more specifically of a cell included in a multimodal haptic device according to the invention, represented placed on the skin S. Said cell is distinguished from that of the second embodiment in that it further comprises a radiant element 140, and in that the cell has a flat topology, even though the heights of the different elements are different, the Peltier module having a height greater than the other elements.

The radiant element can be an infrared (IR) radiant element, for example a low-temperature radiant element to produce a slow heat sensation or, conversely, a high-temperature radiant element for a rapid heat sensation. A radiant element can thus be adapted to rapid heatings, while a heating resistor is more suited to slow heatings. Thus, the two thermal elements can be complementary.

An additional conductive track 204 is provided under the radiant element. Two additional top conductive tracks 304 allow the routing of the control signals for the radiant element 140.

The first encapsulation layer 501 makes it possible to entirely encapsulate the two Peltier elements 111, 112, the heating resistor 130, the radiant element 140 and the vibratory element 150. It further makes it possible to encapsulate the bottom conductive tracks 200, the vias 400 and, possibly, the top conductive tracks 300 to a certain height. The second encapsulation layer 502' makes it possible to cover the top conductive tracks 300.

Furthermore, the top conductive tracks are represented incorporated in an interconnect redistribution layer, forming a flexible top encapsulation layer 502', which makes it possible to effect the routing of all the tracks necessary to the control of the various elements of the cells and to gather all these tracks at a common and flexible output. This feature is not dependent on the addition of a radiant element; it can therefore be applied independently for any other embodiment, or, more broadly, for a multimodal haptic device according to the invention.

In addition, the cell represented comprises a heat sink 700 above the Peltier module. This heat sink is described hereinbelow.

As for the first and second embodiments, the vibratory element and the thermal elements (Peltier elements, heating resistor and radiant element) are incorporated side-by-side in the main plane of the cell, and, here more specifically, in the longitudinal direction X of the cell 10.

Figure 4:
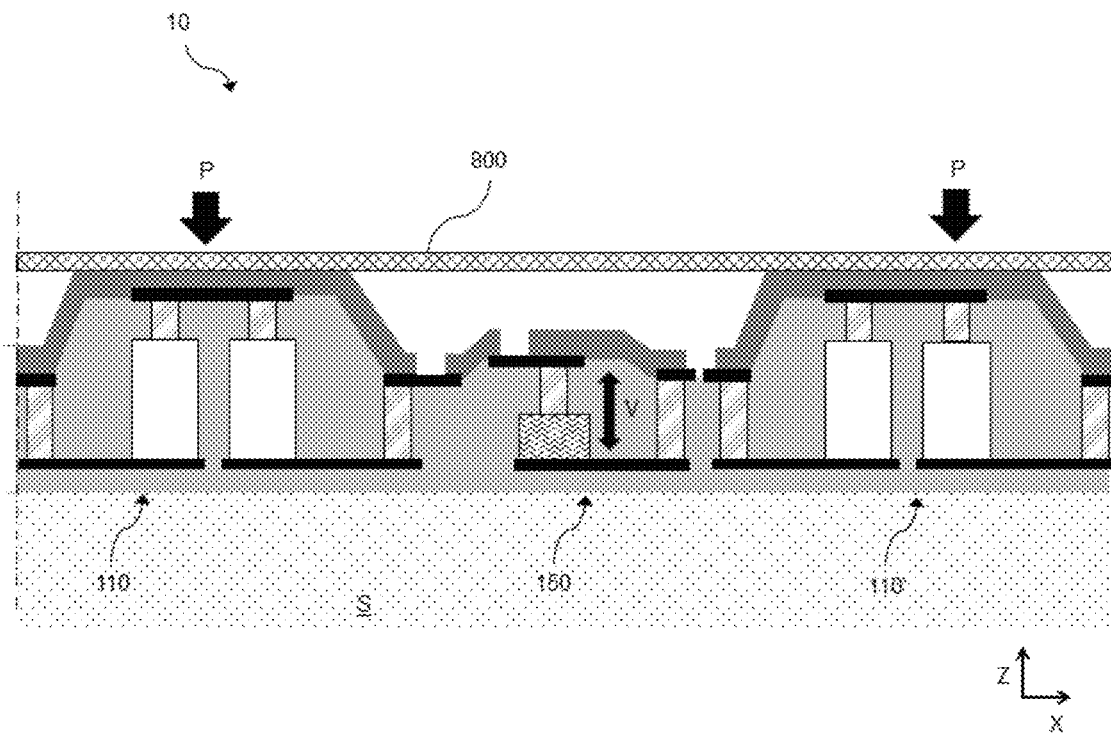
FIG. 4 represents a fourth embodiment of a multimodal haptic device according to the invention.

FIG. 4 represents a fourth embodiment of a multimodal haptic device according to the invention, represented placed on the skin S, more specifically of a cell included in a multimodal haptic device according to the invention. Said cell is distinguished from that of the first embodiment in that it further comprises an additional Peltier module 110' disposed in such a way that the vibratory element 150 is located between the two Peltier modules 110, 110'.

As for the first embodiment, the height of the vibratory element is less than the heights of the two Peltier modules, and this is so to enhance the performance levels of the elements, and notably of the vibratory element. This variation in height is reflected by a variation in the heights of the two encapsulation layers, and notably of the bottom layer 501. A particular topology results therefrom. This topology can advantageously be used to promote the application of the Peltier elements in contact with the skin. Furthermore, this particular topology makes it possible to allow the piezoelectric element freedom of movement to ensure its vibrations. The contact can be enhanced by using, for example, a pressure element 800, such as a layer of polymer or of plastic, possibly elastic, used to keep all of the cell bearing on the Peltier elements, by exerting a pressure on the top surface of the Peltier elements and by thus exerting a pressure against the skin (pressure which can vary). This makes it possible to promote a better thermal contact of the cell with the skin and to promote the vibratory behaviour of the membrane formed by the encapsulating material actuated by the piezoelectric element.

Figure 5:
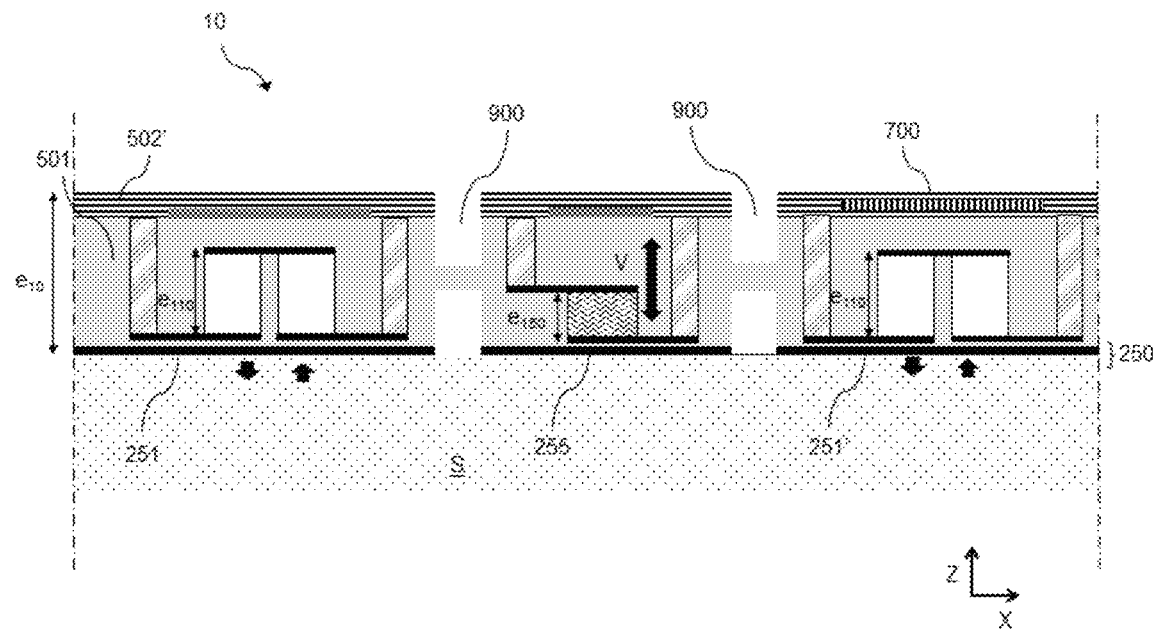
FIG. 5 represents a fifth embodiment of a multimodal haptic device according to the invention.

FIG. 5 represents a fifth embodiment of a multimodal haptic device according to the invention, represented placed on the skin S, more specifically of a cell included in a multimodal haptic device according to the invention, which is distinguished from the other embodiments in that the encapsulation layer 501 is thinned (thinned sections 900) between the elements (here between each Peltier module and the vibratory element) of the cell. That makes it possible to promote the flexibility of the cell. This can be applied for any embodiment, or, more broadly, between at least two elements of a cell included in a multimodal haptic device according to the invention.

It can be seen in FIG. 5 that, as in FIG. 3, the top conductive tracks are represented incorporated in an interconnect redistribution layer, forming the flexible top encapsulation layer 502', a feature which can be applied for any other embodiment, or, more broadly, for a multimodal haptic device according to the invention.

Furthermore, it can be seen that, in this embodiment, a series 250 of complementary heating tracks 251, 255, 251' is inserted under the elements, and under the bottom conductive tracks 200. They make it possible to produce heating resistors under each of the elements of the cell that are thus implemented over almost all of the surface in contact with the skin for a better resolution. As for the heating track of FIG. 2, the heating tracks 250 can be made of graphite (C) or of metal, for example of silver (Ag).

This feature is independent of the thinning of the encapsulating material, and can be applied for any other embodiment, or, more broadly, for a multimodal haptic device according to the invention, without this necessarily being in combination with the feature of thinning of the encapsulating material. Furthermore, complementary heating tracks need not necessarily be inserted under all the elements, but may be inserted under one or a few of the elements forming a cell.

The various embodiments presented hitherto represent elements disposed alongside one another in the longitudinal direction X of a cell. However, this arrangement is not limiting and the vibratory and thermal elements can be positioned in different ways in the plane XY of the cell. In other words, in all the embodiments presented hitherto, the elements can be disposed other than according to an alignment in the longitudinal direction X.

Preferably, the positioning of the various elements is optimized to amplify the vibratory stress through an arrangement of the thermal elements, in particular of Peltier elements and/or modules, around a vibratory element or several vibratory elements.

Figure 6A:
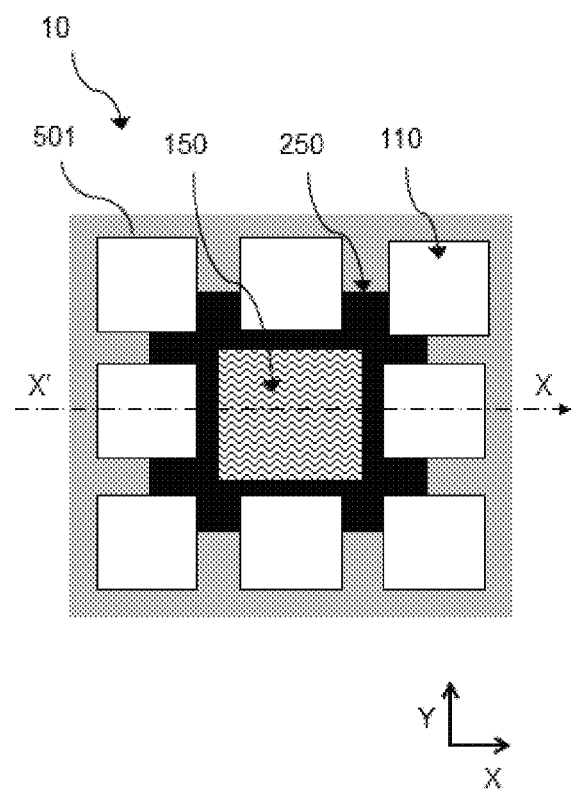
FIGS. 6A-6D represent several examples of configurations between a vibratory element and thermal elements in the plane of a multimodal haptic device according to the invention.
Figure 6B:
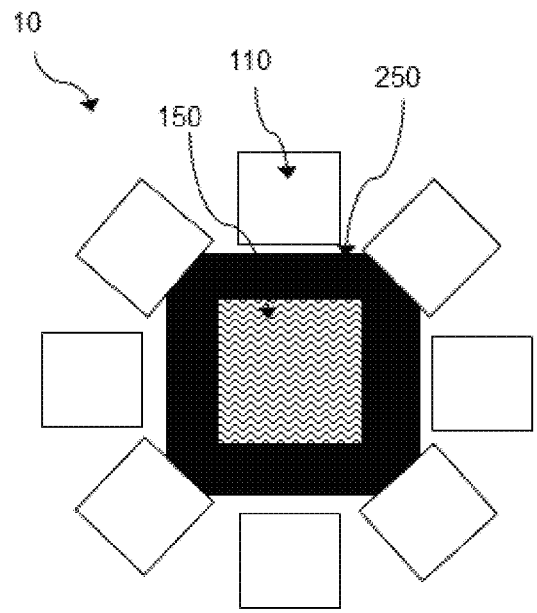
Figure 6B:
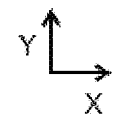
Figure 6C:
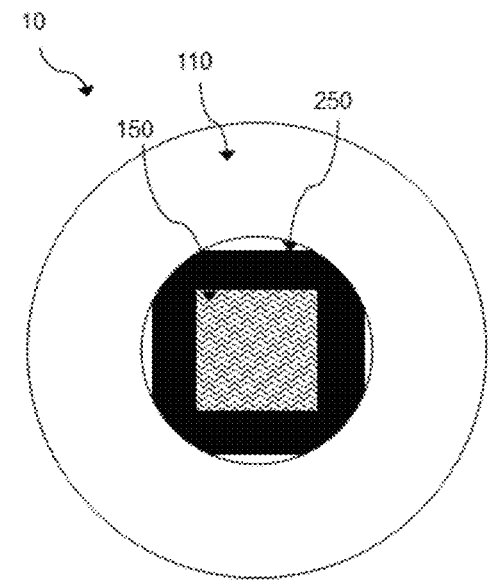
Figure 6C:
Figure 6D:
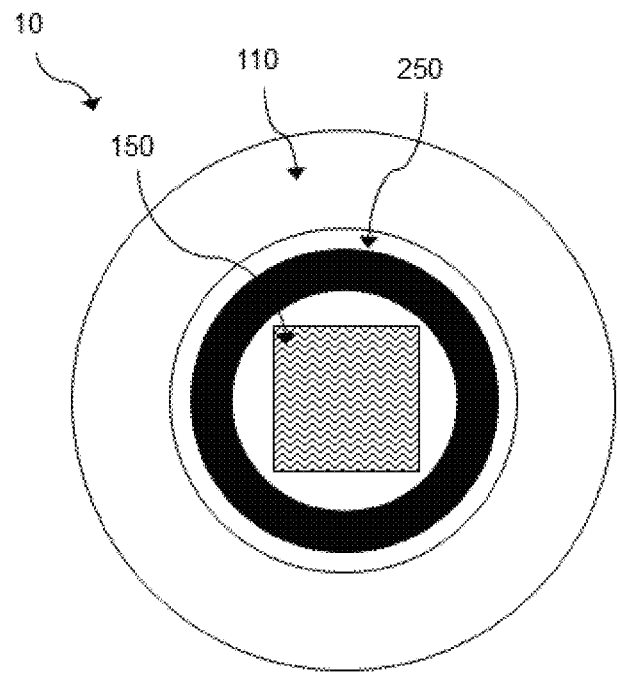
Figure 6D:

FIGS. 6A to 6D present several examples of configurations of the vibratory elements (one piezoelectric element in the examples) and thermal elements (several Peltier modules in the examples) in the plane XY of the cell. The electrical connections are not represented in these figures, but complementary heating tracks 250 making it possible to produce heating resistors are represented. In the four configurations represented, there is a single piezoelectric element 150, and several Peltier modules 110 are disposed around this piezoelectric element, either in square form (FIG. 6A) or in circle form, the Peltier module forming a ring around the piezoelectric element (FIGS. 6B to 6D).

The positioning of the Peltier modules around the piezoelectric element offers several advantages:

the weight of the Peltier modules makes it possible to form an anchorage around the piezoelectric element to ensure the vibratory operation thereof;

the surface thus occupied by the Peltier modules makes it possible to augment their effect to reinforce the thermal sensation; it tallies also with a resolution of the thermal sensations of the skin generally less than that of the mechanical sensations; the coupling between the two functions (vibratory and thermal) thus produced makes it possible to modulate the perception, and to accentuate the cognitive effects.

More generally, the coupling of the two functions (vibratory and thermal) can make it possible for example to amplify the perception and the interpretation by the brain of a stimulus, notably of a thermal stimulation in the presence of a sensation of contact.

In all the embodiments presented, and more broadly in the context of the invention, the different bottom conductive tracks do not necessarily have the same thicknesses. The same applies for the different top conductive tracks. Furthermore, the different bottom conductive tracks can have different heights depending on the element with which they are associated, and likewise for the different top conductive tracks.

The conductive tracks connecting the Peltier elements can be thicker than the conductive tracks connecting the vibratory element, and this is so for the bottom tracks and/or for the top tracks. The bottom and top conductive tracks are not necessarily made of the same materials. More generally in the context of the invention, the characteristics of the electrical connections can be specific to the different elements.

Peltier elements and modules and piezoelectric elements that can be implemented for each of the embodiments presented, and more generally for a multimodal haptic device according to the invention, will now be detailed.

Peltier Elements and Modules

To obtain a sufficient spatial resolution for both thermal and vibratory stress, the dimensions of the Peltier elements are preferably limited to a few millimetres maximum, even to less than a millimetre.

Preferably, use is made of several thermoelectric elements or Peltier elements ("thermoelectric leg"), and notably a plurality of N and P elements linked together and whose heights lie between 0.2 and 5 mm, preferably 0.2 to 1 mm, and whose sections lie between 0.2 and 4 mm$^2$ (typically 1 mm$^2$). The Peltier elements can be produced based on bismuth telluride, which allows operation at temperatures between −10 and 100° C., or based on silicides (MgSiSn, MnSi, SiGe, etc).

For ease of integration in a cell, the one or two Peltier elements are preferably previously incorporated in a module, that is to say preassembled on an insulating substrate covered with conductive tracks (typically copper or silver). Conventionally, a thin substrate is used made of aluminium nitride (AlN), of alumina (Al$_2$O$_3$), of zirconia (ZrO$_2$), even of Kapton® (polyimide film), the latter making it possible to guarantee flexibility of the Peltier module. When the substrate is not flexible, the Peltier module can be made flexible, for example by assembling elements together with a flexible material. Preferably, the overall height of a module (substrate, elements and tracks) is less than 2 millimetres.

In the different embodiments presented, and more generally for a multimodal haptic device according to the invention, the elements present are controlled electrically via the top conductive tracks which allow control voltages and/or currents to be applied to them. These controls are produced in such a way as to locally generate vibratory and thermal touch sensations. Preferably, the control is dynamic, that is to say only the elements situated on the zones to be stimulated are activated electrically; thus, each zone can be displaced and its surface modulated in time, thus giving a realistic impression of stimulation moving on the surface of the skin.

Each Peltier module can be driven by the application of a current ranging from a few tens of pamperes to a few amperes as a function of the materials and the geometry of the modules (notably size and number of elements).

A Peltier module can be coupled with a thermocouple, a thermistor or any other means capable of measuring the temperature on contact with the skin when the haptic device is applied to the skin of a person, the measured temperature being able to enter into a feedback loop in order to determine the current to be applied at the input of the module.

Depending on the configuration of the Peltier module and possibly of the heat sink associated with the module, the temperature difference can range from a few degrees for a relatively short time to a few tens of degrees continuously (typically 20° C.). For a thermal sensation of strong cooling prolonged beyond a few minutes, a heat sink must be used to discharge the heat. Without a heat sink or with a very thin one, the cold thermal sensation will be transient and will last from a few seconds to approximately 1 minute.

A cell can further comprise complementary thermal means associated with the thermal elements, like a heat sink (identified by the reference 700 in FIG. 3) and/or complementary mechanical means associated with the vibratory element, such as a stiffener, all of this in order to enhance the performance levels. These complementary thermal and/or mechanical means can consist of additional elements or can be obtained by an integration and an optimized placement of the already existing elements.

Figure 7A:
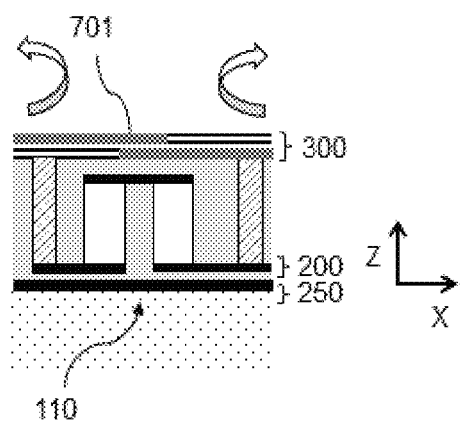
FIGS. 7A-7C represent different heat sink means associated with a Peltier module of a multimodal haptic device according to the invention.
Figure 7A:
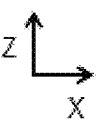
Figure 7B:
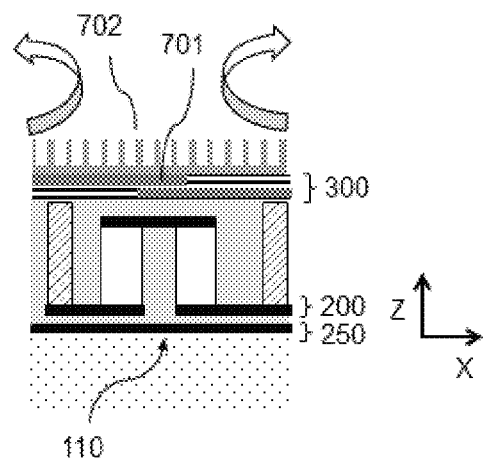
Figure 7C:
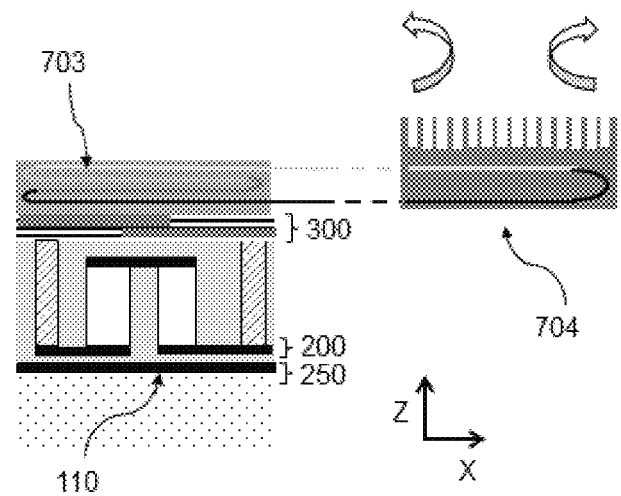

Different heat sinks are represented in FIGS. 7A to 7C. These heat sinks are advantageously implemented to guarantee optimal operation of a Peltier module in cooling mode.

In FIG. 7A, the heat sink is a heat diffuser 701 incorporated or already existing in the top conductive tracks 300, and more specifically in the conductive track situated above the Peltier module. The diffuser can be made of metal or of carbon.

Such a diffuser thus configured makes it possible to enhance the natural convection by allowing, on the one hand, a better distribution of the heat and, on the other hand, an increase in the heat exchange surface area with the outside. In steady state condition, it can provide a temperature difference of a few ° C., and in transient state, it can provide a greater temperature difference over a timescale of less than 1 second.

This solution is one of the solutions that are preferred when the Peltier module and/or the cell is flexible.

In FIG. 7B, a passive external heat sink element 702, for example a block of copper or of aluminium with fins, is added to the top conductive tracks 300, at least the conductive track situated above the Peltier module to allow the natural convection to be enhanced. As represented, the heat sink element with fins is in contact with the thermal diffuser 701.

Such an external heat sink element makes it possible to promote the storage of the heat absorbed by the Peltier module (storage in the form of specific heat capacity) and the discharging thereof into the ambient air by natural convection. In steady state condition, it can provide a temperature difference of a few ° C., and in transient state, it can provide a greater temperature difference over a timescale of a few seconds.

This solution is however limited when the module and/or the cell is flexible, unless it is offset outside the flexible zone.

In FIG. 7C, a microfluidic circuit 703, possibly flexible, is disposed above the Peltier module, on the top conductive tracks 300, at least on the conductive track situated above the Peltier module. This makes it possible to even further enhance the heat dissipation, by forced conversion, by extracting the heat using a heat-transfer fluid in the cooling. The extracted heat is then routed to a heat exchanger 704 to cool the heat-transfer liquid by natural convection. Such a device can be designed to be portable. In steady state condition, it can provide a temperature difference of several tens of ° C.

Vibratory Elements

The vibratory elements can be piezoelectric elements, ferroelectric elements and/or electromagnetic elements. The geometries of these vibratory elements can vary. It is for example possible to use elements of parallelepipedal form with square section, with a side of between 0.5 and 10 mm, preferably 1 mm. The thickness can be between 1 μm and 1 mm, preferably between 50 and 100 μm. The voltages to be applied to the material will be all the greater when the thickness is great, to obtain an electrical field and therefore an equivalent vibratory effect.

FIGS. 8A, 8B, 8C and 8D represent four variants corresponding to the configuration of a cell according to FIG. 6A, that is to say with a piezoelectric element 150 at the centre and eight Peltier modules 110 around it, but without the resistor 250, seen in cross-section along the axis XX' and applied to a skin S. The different variants make it possible to exploit the presence of the Peltier modules around the piezoelectric element to enhance the operation and the vibratory response of the piezoelectric element.

Figure 8A:
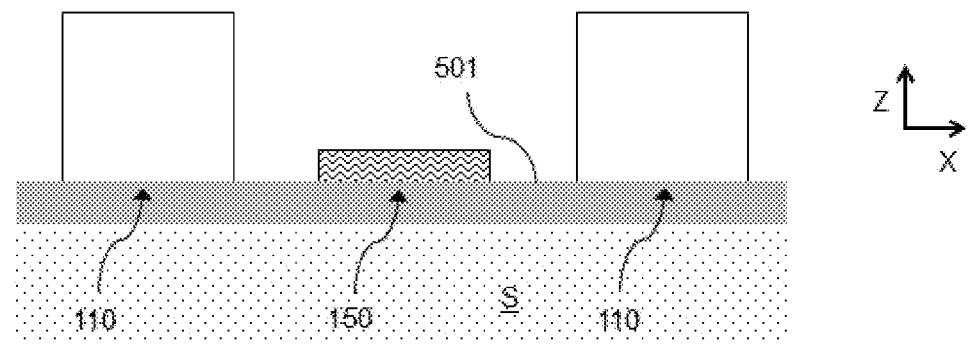
FIGS. 8A-8D represent four variants corresponding to the configuration of FIG. 6A.

FIG. 8A represents a first variant in which the encapsulation layer 501 makes it possible to anchor the bottom parts of the Peltier modules and of the piezoelectric element, but it does not encapsulate them entirely.

The thickness of the encapsulation layer is 150 μm and its dimensions in the plane XY are 5*5 mm$^2$.

Figure 8B:
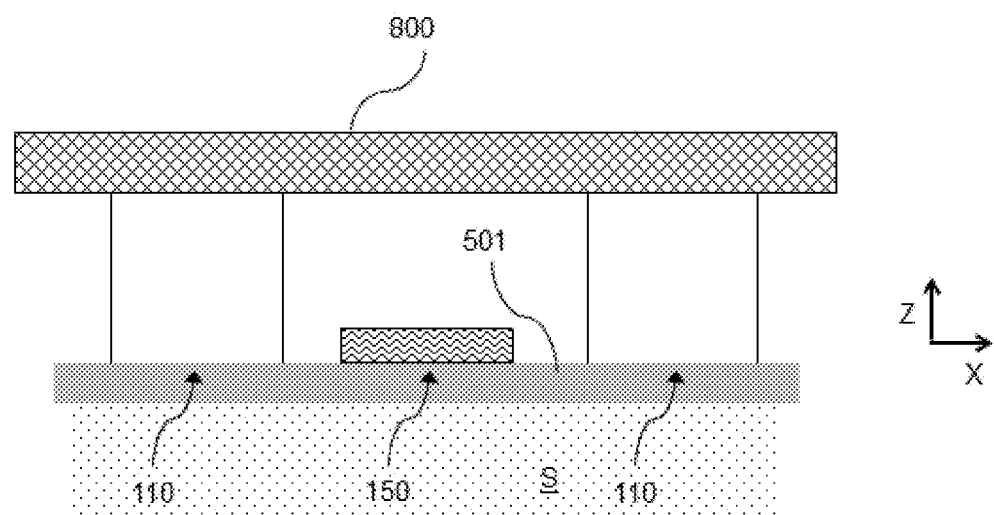

FIG. 8B represents a second variant which differs from the first variant in that it further comprises a pressure element 800, such as a layer of polymer or of plastic, possibly elastic, used to keep all of the cell bearing on the Peltier elements, by exerting a pressure on the top surface of the Peltier elements and by thus exerting a pressure against the skin (pressure which can vary). This makes it possible to promote a better thermal contact of the cell with the skin and to promote the vibratory behaviour of the membrane formed by the encapsulating material actuated by the piezoelectric element.

The thickness of the encapsulation layer is 150 μm and its dimensions in the plane XY are 5*5 mm$^2$.

Figure 8C:
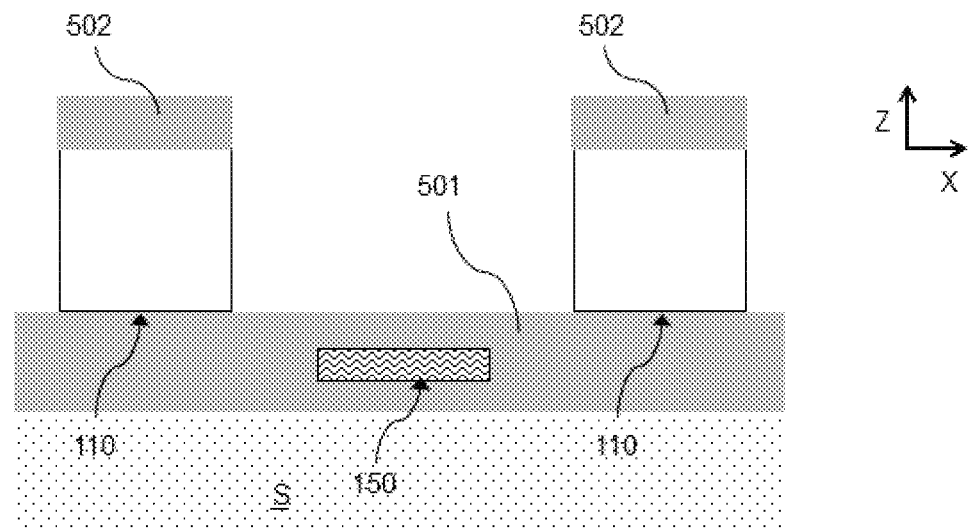

FIG. 8C represents a third variant which differs from the first variant in that the piezoelectric element is entirely encapsulated in the first encapsulation layer 501 which has a thickness of 650 μm (150 μm+500 μm). The Peltier modules are anchored in the bottom part by the first encapsulation layer 501 and in the top part by a second encapsulation layer 502 that is 500 μm thick.

The dimensions of the encapsulation layers in the plane XY are 5*5 mm$^2$.

Figure 8D:
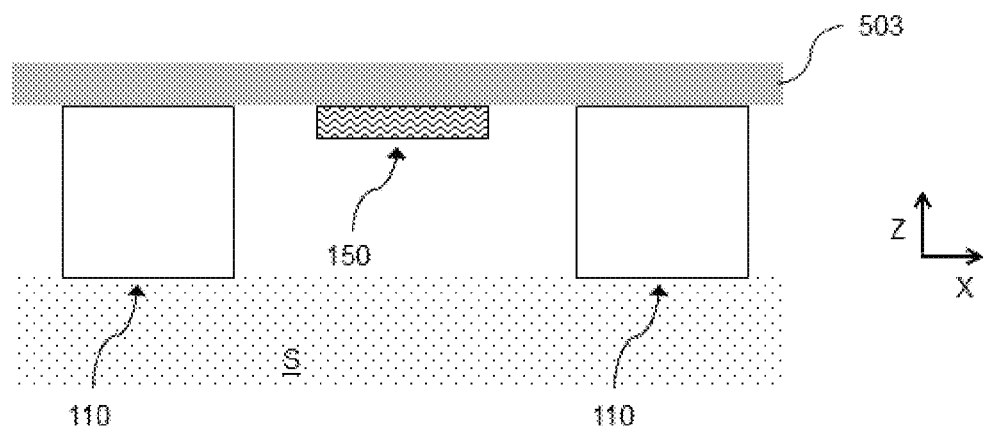

FIG. 8D represents a fourth variant which differs from the first variant in that the piezoelectric element and the Peltier modules are anchored in the top part by an encapsulation layer 503 that is 150 μm thick.

The dimensions of the encapsulation layer 503 in the plane XY are 5*5 mm$^2$.

Simulations by COMSOL digital simulation software were carried out for the different variants.

The simulations were carried out with Peltier modules each forming a cube of 1 mm$^3$ and the piezoelectric element forming a parallelepiped of 1 mm$^2$ over a height of 100 μm. In the simulations, the Peltier modules are evenly spaced apart from one another and from the piezoelectric element, with a distance of 500 μm between two adjacent Peltier modules, and between the piezoelectric element and the closest Peltier modules. The dimensions of the first or the second encapsulation layer in the plane XY are 5*5 mm$^2$ and the thickness is 150 μm or 650 μm as indicated above.

The encapsulating material is preferably flexible. It can be a flexible polymer. The simulations were carried out with a polyimide.

This is not limiting: the Peltier modules and the piezoelectric element can have the same dimensions in the plane XY (and different heights) or different dimensions in the plane XY. Likewise, the different Peltier modules can also have the same dimensions or different dimensions (in the plane XY and/or in height Z). Furthermore, the spacing in a given direction X and/or Y between two adjacent Peltier modules is a function of the dimension of said elements in said direction. The spacing in a given direction X and/or Y can lie within a range ranging from 1/10 to 2 times the dimension of the element in said direction. Furthermore, the piezoelectric element can extend over the entire surface left free by the Peltier modules at the centre of the cell or extend over a part of this surface. Preferentially, half the dimension of the piezoelectric element in the direction X, respectively in the direction Y, lies between 50 and 60% of the distance between the piezoelectric element and the Peltier modules that are closest in the direction X, respectively the direction Y. The encapsulating material can be made of another flexible polymer, or even is not necessarily flexible.

The simulations show that the encapsulation layer forms a membrane which can transmit the vibration generated by the piezoelectric element, which generates a vibrotactile effect on the skin (which can be accompanied by a thermal effect by the Peltier modules). Furthermore, the Peltier modules with the encapsulation material form a stiffener for the actuation of the piezoelectric element, thus enhancing the vibratory operation.

The inventors have thus demonstrated a synergistic effect between the Peltier modules and the vibratory element, the Peltier modules not only serving to produce heat or cold, but also contributing to the operation of the vibratory element. It should be noted that this could be true for any other thermal element, other than a Peltier element, provided that it has a height greater than the vibratory element. This further makes it possible to avoid adding a complementary mechanical element associated with the vibratory element, such as a stiffener.

The vibration amplitude depends on several parameters including the size of the membrane formed by the encapsulation layer, and the type of vibratory element. The inventors have determined that an amplitude of the order of 10 μm (compatible with a vibrotactile haptic effect) can easily be achieved under a voltage of the order of 10 V with a membrane/encapsulation layer of 1 cm$^2$.

The resonance frequency of the cell depends on several parameters including the thickness of the membrane/encapsulation layer and in particular the thickness of encapsulation around the piezoelectric element as illustrated in FIG. 8C. The inventors have determined that the resonance frequency of the cell was 244 kHz for a thickness of 650 μm (FIG. 8C), compared to 77 kHz for a thickness of 150 μm (FIG. 8A or FIG. 8B).

The resonance frequency of the cell depends also on the dimensions in the plane of the membrane/encapsulation layer. The inventors have determined that, by increasing the dimensions of the encapsulation layer, the resonance frequency is reduced. The simulation made it possible to show that, with dimensions of 7*7 mm$^2$ (and with a piezoelectric element of 3.5*3.5 mm$^2$ and 20 Peltier modules), the resonance frequency was 31.5 kHz, and that, with dimensions of 20*20 mm$^2$ (and with a piezoelectric element of 10*10 mm$^2$ and 56 Peltier modules), the resonance frequency was 3.8 kHz.

The simulation of the fourth variant of FIG. 8D gives a frequency of 77 kHz. This fourth variant allows an acoustic wave to be transmitted to the surface of the skin.

Figure 9A:
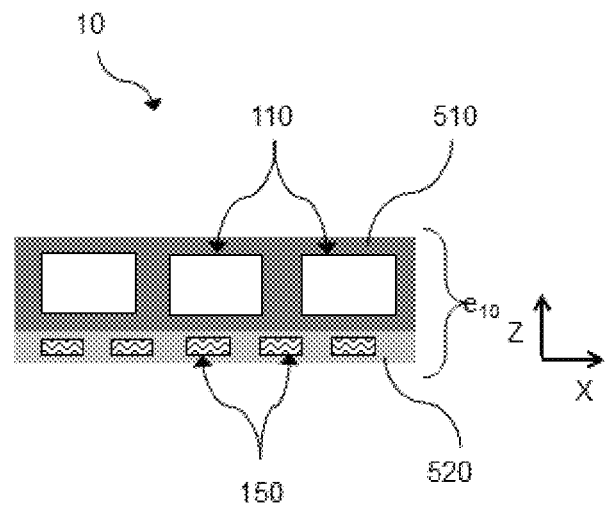
FIGS. 9A-9B represent a sixth embodiment, according to two variants, of a multimodal haptic device according to the invention.
Figure 9B:
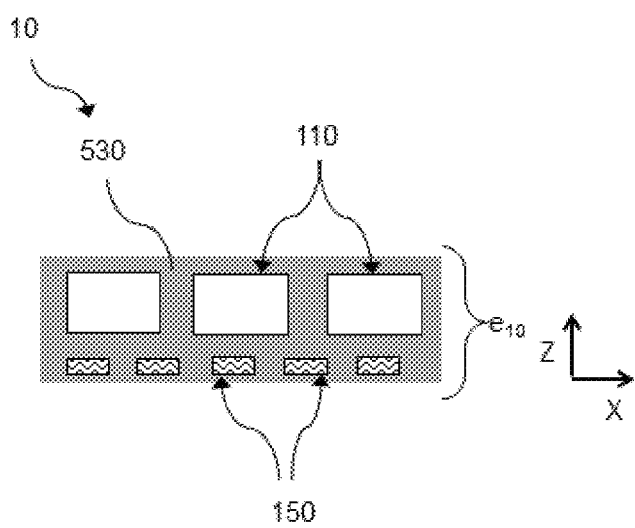

FIGS. 9A and 9B represent a sixth embodiment of a multimodal haptic device according to the invention, in which the elements are not disposed alongside one another in the plane XY, but on top of one another in the direction Z at right angles to the plane. FIGS. 9A and 9B specifically represent thermal elements (notably a Peltier module) disposed above vibratory elements, and assembled together.

In a first variant (FIG. 9A), the thermal elements 110 are encapsulated in a first encapsulation layer 510, and the vibratory elements 150 are encapsulated in a second encapsulation layer 520, the two layers being made of the same material or of two different materials. The two layers are assembled together, for example by lamination of said layers. The layers can be flexible, for example made of a flexible polymer. Each of the layers can include the electrical connections allowing the various elements to be powered and driven.

In a second variant (FIG. 9B), the thermal elements 110 and the vibratory elements 150 are encapsulated in one and the same encapsulation layer 530.

This sixth embodiment can be developed in a plurality of variants which cannot all be expanded on, with thermal elements which are not only Peltier elements, with one or more vibratory elements, with one or more additional layers, etc. Furthermore, this embodiment can be combined with the other embodiments, in that the elements can be disposed alongside one another in the plane XY and also in the direction Z. All technically possible combinations can be envisaged.

Several cells, notably the cells described according to the different embodiments, can be assembled alongside one another in the plane XY in matrix form, which makes it possible to obtain a haptic device of greater surface area. It is possible to assemble the same types of cells or different cells.

Figure 10:
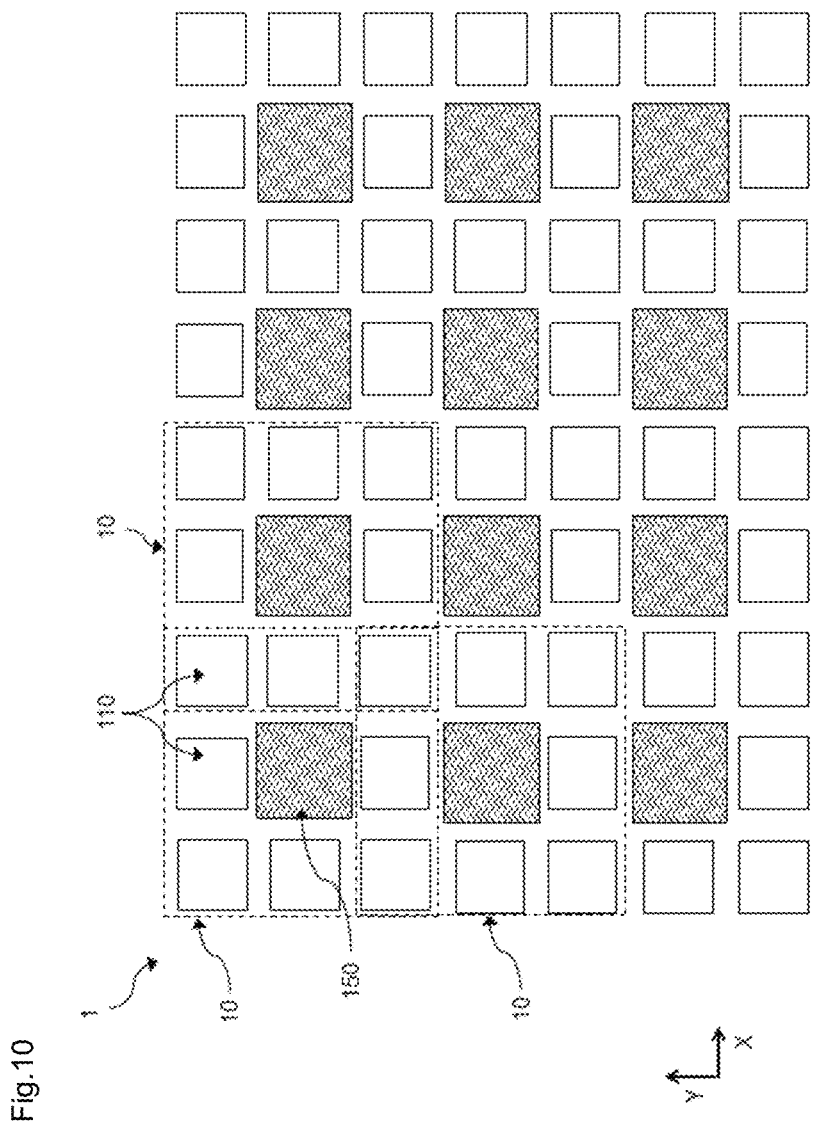
FIG. 10 represents a matrix consisting of several cells of a multimodal haptic device according to the invention.

FIG. 10 represents a matrix consisting of several cells, the matrix being included in a multimodal haptic device according to the invention. The matrix 1 is represented very schematically without the electrical connections necessary for powering and driving the various elements. The matrix represented comprises a plurality of identical basic cells 10. The basic cell corresponds to the cell of FIG. 6A (one central piezoelectric element 150 and eight Peltier modules evenly disposed around it) which is repeated regularly several times. Furthermore, two adjacent cells share a row of three Peltier modules.

The matrix represented comprises several identical cells disposed regularly alongside one another in the plane XY and they are encapsulated in one and the same encapsulation layer. However, this configuration is not limiting. Thus, a matrix can be composed of:

several identical or different cells; and/or
several cells disposed regularly or irregularly in the plane XY; and/or
cells with different encapsulation layers; and/or
one or more elements disposed one on top of the other in the direction Z at right angles to the plane XY; and/or
one or more cells disposed one on top of the other in the direction Z at right angles to the plane XY, etc.

Figure 11:
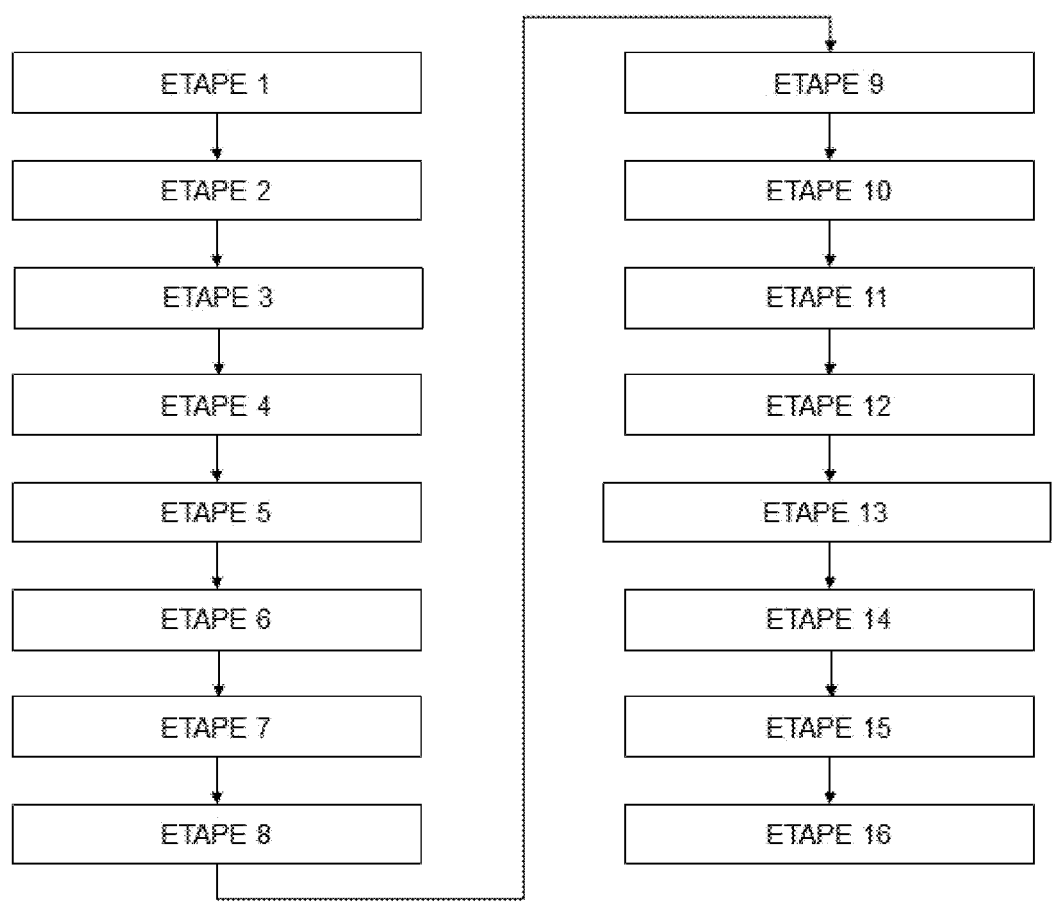
FIG. 11 represents an example of a method for producing a multimodal haptic device according to the invention.

FIG. 11 represents an example of a method for producing a multimodal haptic device according to the invention, and more particularly a cell included in a device according to the invention. Regarding the references of the elements in a cell, reference can be made to the preceding figures, and notably to FIGS. 1 to 5:

Step 1: the starting point is a substrate made of an insulating material which can be a flexible or stretchable substrate made of polymer (PET, PEN, PI, PC, silicone, etc.), a thin glass or even a thin metal; the substrate can be obtained in dry film or solidified liquid film form;

Step 2 (optional): one or more heating tracks 250 are deposited; they can be made of a metal or of a conductive ink (for example based on silver or carbon) deposited then structured by lithography or printing;

Step 3 (optional): a film made of an insulating material is deposited; it can be one of the materials cited for the substrate, even the same as the material of the substrate, and it can be obtained in dry film or solidified liquid film form;

Step 4: the bottom conductive tracks 200 are produced; they can be made of a metal or of a conductive ink (for example based on silver or carbon) deposited then structured by lithography or printing;

Step 5: the vibratory element or elements 150 are brought into contact with the corresponding bottom conductive tracks 205;

Steps 6 and 7: the thermal element or elements 111, 112, 110, 130, 140 are brought into contact with the corresponding bottom conductive tracks 201, 202, 203, 204: for example at least one Peltier element 11 of P type and at least one Peltier element 112 of N type to form a Peltier module 110, a heating resistor 130 and/or a radiant element 140;

Step 8: a layer of an insulating material is deposited: this can be one of the materials cited for the substrate, even the same as the material of the substrate; this deposition can be performed in liquid form, for example by one of the "spin coating" or "slot die" methods known to a person skilled in the art; that makes it possible to finalize the first layer of insulating material (first encapsulation layer 501);

Step 9 (optional): a step of planarization of the layer of insulating material deposited in step 8 can be provided, for example by chemical mechanical polishing (CMP), Step 10: the vias 400 in the layer of insulating material deposited in step 8 are opened, by using, for example, a lithography and chemical or plasma etching method, or a laser method;

Step 11: the vias are filled with a conductive material (for example copper) to produce the electrical connections: this can involve a growth method (an "electroless" method or a method for deposition of conductive paste by screen printing);

Step 12: the top conductive tracks 300 (connection for Peltier elements and routings for the various elements) are produced: this can involve a metal or a conductive ink (for example based on silver or carbon) deposited then structured by lithography or printing;

Step 13 (optional): the routing interconnects can be produced, notably with several levels if necessary: this can involve a metal or a conductive ink (for example based on silver or carbon) deposited then structured by lithography or printing;

Step 14: the second layer of insulating material (second encapsulation layer 502) is produced; this can involve one of the materials cited for the substrate, even the same as the material of the substrate, and it can be applied in dry film or solidified liquid film form;

Step 15: the openings of the pads 600 are produced in the second layer, to allow the connections for driving all of the elements, by using, for example, a lithography and chemical or plasma etching method, or a laser method;

Step 16 (optional): the thinned sections 900 of one or more layers of insulating material can be produced, for example by a lithography and chemical or plasma etching method, or by a laser method.

Regarding steps 1, 3 and 8, they form the first encapsulation layer as described previously, but in several steps in order to be able to support, introduce and cover the elements and the conductive tracks. It can be seen that this first layer can be made of a single insulating material or of several different insulating materials.

Regarding step 5, these can be piezoelectric elements or ferroelectric elements, even electromagnetic elements, for example elements based on PZT (lead zirconate titanate) or any other suitable material; the transfer can be performed by a method of "pick and place" type (taking of an element from a source support by a motorized arm, positioning and placement of the element on the substrate).

Regarding steps 6 and 7, the Peltier elements can be produced based on bismuth telluride, which allows operation at temperatures between −10 and 100° C., or based on silicides (MgSiSn, MnSi, SiGe, etc.), materials with lower performance levels over this temperature range but the resources of which are less limited.

The Peltier elements can be integrated beforehand in modules, that is to say preassembled on an insulating substrate covered with conductive tracks (typically copper or silver). Thus, the Peltier elements can be produced based on solid materials transferred by a "pick and place" method onto insulating substrates of DBC (Direct Bonded Copper) type, such as aluminium nitride (AlN), alumina ($Al_2O_3$), zirconia ($ZrO_2$), even Kapton® (polyimide film), or by thin or thick deposition techniques (a few tens to a few hundreds of micrometres).

Preferably, thinned solid elements (typically between 200 and 600 μm) are used to enhance their performance levels. These elements can also be deposited or printed in films (carbon nanotube/polymer composites, $TiS_2$/hexylamine super lattices).

Thus, a cell can be easily manufactured by known microelectronic fabrication methods. Several cells can be produced at the same time during the steps described previously, in order to form a matrix of several cells.

The different embodiments presented can be combined with one another.

Furthermore, the present invention is not limited to the embodiments previously described, but extends to any embodiment that falls within the scope of the claims.

The invention claimed is:

1. A multimodal haptic device comprising a matrix incorporating at least one cell, each cell comprising:
    at least one thermal element to generate a cooling and a heating;
    at least one vibratory element to generate a vibration; and
    at least one encapsulation layer made of an electrically insulating material;
the at least one vibratory element and the at least one thermal element being anchored in at least one part in said at least one encapsulation layer;
    each cell being adapted to be in contact directly or indirectly with the skin of a person such that said at least one thermal element is able to transmit thermal sensations to that person and such that at least one vibratory element is able to transmit vibratory sensations to that person, said cell having a thickness less than or equal to ten millimetres, the at least one thermal element having a height greater than that of the at least one vibratory element.

2. The device according to claim 1, at least one cell further comprising:
    a plurality of bottom conductive tracks, to produce the electrical connections at the bottom parts of the thermal and vibratory elements; and
    a plurality of top conductive tracks, to produce the electrical connections at the top parts of the thermal and vibratory elements.

3. The device according to claim 2, the at least one cell further comprising a plurality of conductive vias, said vias allowing vertical electrical connections to be produced between the top conductive tracks and the thermal and vibratory elements.

4. The device according to claim 1, the at least one encapsulation layer comprising a first encapsulation layer made of a first insulating material and a second encapsulation layer made of a second insulating material, the first and second layers being able to be joined, and/or the first and second insulating materials being able to be the same.

5. The device according to claim 4, at least one cell further comprising:
    a plurality of bottom conductive tracks, to produce the electrical connections at the bottom parts of the thermal and vibratory elements; and
    a plurality of top conductive tracks, to produce the electrical connections at the top parts of the thermal and vibratory elements;
    the at least one cell further comprising a plurality of conductive vias, said vias allowing vertical electrical connections to be produced between the top conductive tracks and the thermal and vibratory elements; and
    the second encapsulation layer incorporating the top conductive tracks, forming an interconnect redistribution layer.

6. The device according to claim 1, at least one thermal element being a Peltier element.

7. The device according to claim 6, at least one cell comprising a heat sink means associated with at least one Peltier module.

8. The device according to claim 1, at least one thermal element being a heating resistor and/or a radiant element.

9. The device according to claim 1, at least one vibratory element being a piezoelectric element, a ferroelectric element and/or an electromagnetic element.

10. The device according to claim 1, at least one thermal and/or vibratory element, being entirely encapsulated in at least one encapsulation layer.

11. The device according to claim 1, the at least one encapsulation layer being made of one or more of the following materials: a polymer comprising a polyethylene terephthalate (PET), a polyethylene naphthalate (PEN), a polyimide (PI), a polycarbonate (PC) or a silicone; a glass; a metal; or a non-organic material comprising silicon oxide.

12. The device according to claim 1, the at least one encapsulation layer being made of a flexible or stretchable material.

13. The device according to claim 1, at least one cell further comprising at least one additional heating track under at least one thermal and/or vibratory element.

14. The device according to claim 1, at least one cell comprising thinned sections between at least two thermal and/or vibratory elements in the thickness of at least one encapsulation layer.

15. The device according to claim 1, at least one cell comprising a pressure element, disposed over all of said cell and bearing on at least one element, to indirectly exert a pressure against the skin.

16. The device according to claim 1, at least one cell comprising:
    a central vibratory element; and
    at least two Peltier modules disposed around said vibratory element.

17. The device according to claim 16, the Peltier modules having heights greater than the height of the vibratory element.

18. The device according to claim 1, the matrix comprising several cells.

19. The device according to claim 1, at least two thermal and/or vibratory elements being disposed one on top of the other in one and the same cell and/or a matrix of cells.

20. The device according to claim 1, at least two thermal and/or vibratory elements being disposed alongside one another in one and the same cell and/or a matrix of cells.

\* \* \* \* \*